United States Patent
Buschmann

(10) Patent No.: US 9,725,049 B2
(45) Date of Patent: Aug. 8, 2017

(54) DEVICE FOR HOLDING A CAMERA HAVING FOUR JOINTS

(71) Applicant: Huf Hülsbeck & Fürst GmbH & Co. KG, Velbert (DE)

(72) Inventor: Gerd Buschmann, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 56 days.

(21) Appl. No.: 14/434,103

(22) PCT Filed: Oct. 9, 2013

(86) PCT No.: PCT/EP2013/071085
§ 371 (c)(1),
(2) Date: Apr. 8, 2015

(87) PCT Pub. No.: WO2014/056997
PCT Pub. Date: Apr. 17, 2014

(65) Prior Publication Data
US 2015/0258944 A1    Sep. 17, 2015

(30) Foreign Application Priority Data

Oct. 10, 2012  (DE) .................. 10 2012 109 611

(51) Int. Cl.
*B60R 11/04*   (2006.01)
*B60R 1/00*    (2006.01)
(Continued)

(52) U.S. Cl.
CPC ............. *B60R 11/04* (2013.01); *B60R 1/00* (2013.01); *G08B 13/19619* (2013.01);
(Continued)

(58) Field of Classification Search
CPC ............. G08B 13/19632; B60R 11/04
(Continued)

(56) References Cited

U.S. PATENT DOCUMENTS 8,821,043 B2 * 9/2014 Schutz .................... B60R 11/04
                                                      396/419
8,961,044 B2 * 2/2015 Barthel ................... B60R 11/04
                                                      396/428
(Continued)

FOREIGN PATENT DOCUMENTS

CN    101528506    9/2009
DE     10204764    8/2003
(Continued)

OTHER PUBLICATIONS

DE102010060573A1; Joachim Barthel, Device having a camera unit and a protection member havin a compact traversal; May 16, 2012; English Translation.*

(Continued)

*Primary Examiner* — Roberto Velez
*Assistant Examiner* — Cynthia Segura

(57) ABSTRACT

The invention relates to a device for holding a camera, which serves in particular as a parking assistance in a vehicle, said device having a housing (10) in which a carriage (20), to which said camera can be secured, is movably accommodated, wherein said carriage (20) can be driven by a gear system (30). The gear system (30) has a first swiveling element (31) and a second swiveling element (32) which are connected to the carriage (20) in an articulated matter, and each swiveling element (31, 32) is rotatably mounted on the housing (10) in such a way and the carriage (20) is rotatably mounted on each swiveling element (31, 32) in such a way that the carriage (20), between a resting position (A) and an operating position (B), carries out at least a first movement phase (I) and a second movement phase (II).

17 Claims, 6 Drawing Sheets

(51) Int. Cl.
  *G08B 13/196* (2006.01)
  *H04N 5/225* (2006.01)
  *B60R 11/00* (2006.01)

(52) U.S. Cl.
  CPC ..... *G08B 13/19632* (2013.01); *H04N 5/2252* (2013.01); *H04N 5/2253* (2013.01); *B60R 2011/004* (2013.01); *B60R 2011/0082* (2013.01); *B60R 2300/806* (2013.01)

(58) Field of Classification Search
  USPC ................................................. 348/373, 148
  See application file for complete search history.

(56) References Cited

U.S. PATENT DOCUMENTS

| | | | | |
|---|---|---|---|---|
| 2004/0258190 | A1* | 12/2004 | Neau ....................... | G21C 17/00 376/249 |
| 2008/0156626 | A1* | 7/2008 | Buschmann ............ | E05B 81/76 200/302.2 |
| 2009/0231430 | A1* | 9/2009 | Buschmann ......... | B60Q 1/0023 348/148 |
| 2009/0309971 | A1* | 12/2009 | Schuetz .................. | B60R 11/04 348/148 |
| 2012/0007984 | A1* | 1/2012 | Schutz .................... | B60R 11/04 348/148 |
| 2013/0286233 | A1* | 10/2013 | Kozlov ................. | B66F 11/048 348/208.7 |
| 2014/0029070 | A1* | 1/2014 | Morinaga ............ | H04N 1/0057 358/497 |
| 2014/0197649 | A1* | 7/2014 | Hansen .................. | B60R 11/04 292/336.3 |
| 2014/0348498 | A1* | 11/2014 | Aiba ...................... | G03B 13/32 396/20 |
| 2015/0258945 | A1* | 9/2015 | Schutz .................... | B60R 11/04 348/373 |
| 2016/0176347 | A1* | 6/2016 | Kiehl ........................ | B60R 1/00 348/148 |
| 2016/0219204 | A1* | 7/2016 | Nickel ................. | H04N 5/2251 |
| 2016/0316114 | A1* | 10/2016 | Buss ....................... | B60R 11/04 |
| 2017/0123346 | A1* | 5/2017 | Shimizu ............. | G03G 15/0865 |

FOREIGN PATENT DOCUMENTS

| | | |
|---|---|---|
| DE | 102009008281 | 8/2010 |
| DE | 102010060573 | 5/2012 |
| EP | 1332923 | 8/2003 |
| EP | 2144435 | 1/2010 |
| WO | WO 2009/101044 | 8/2009 |
| WO | WO 2014/056997 | 4/2014 |

OTHER PUBLICATIONS

Notification of Office Action and Search Report Dated Apr. 25, 2016 From the State Intellectual Property Office of the People's Republic of China Re. Application No. 201380052759.8 and Its Translation of Office Action in English.

Notification of Office Action Dated Apr. 14, 2016 From the State Intellectual Property Office of the People's Republic of China Re. Application No. 201380052760.0 and Its Translation Into English.

International Search Report and the Written Opinion Dated Dec. 11, 2013 From the European Patent Office Re. Application No. PCT/EP2013/071085 and Its Translation Into English.

\* cited by examiner

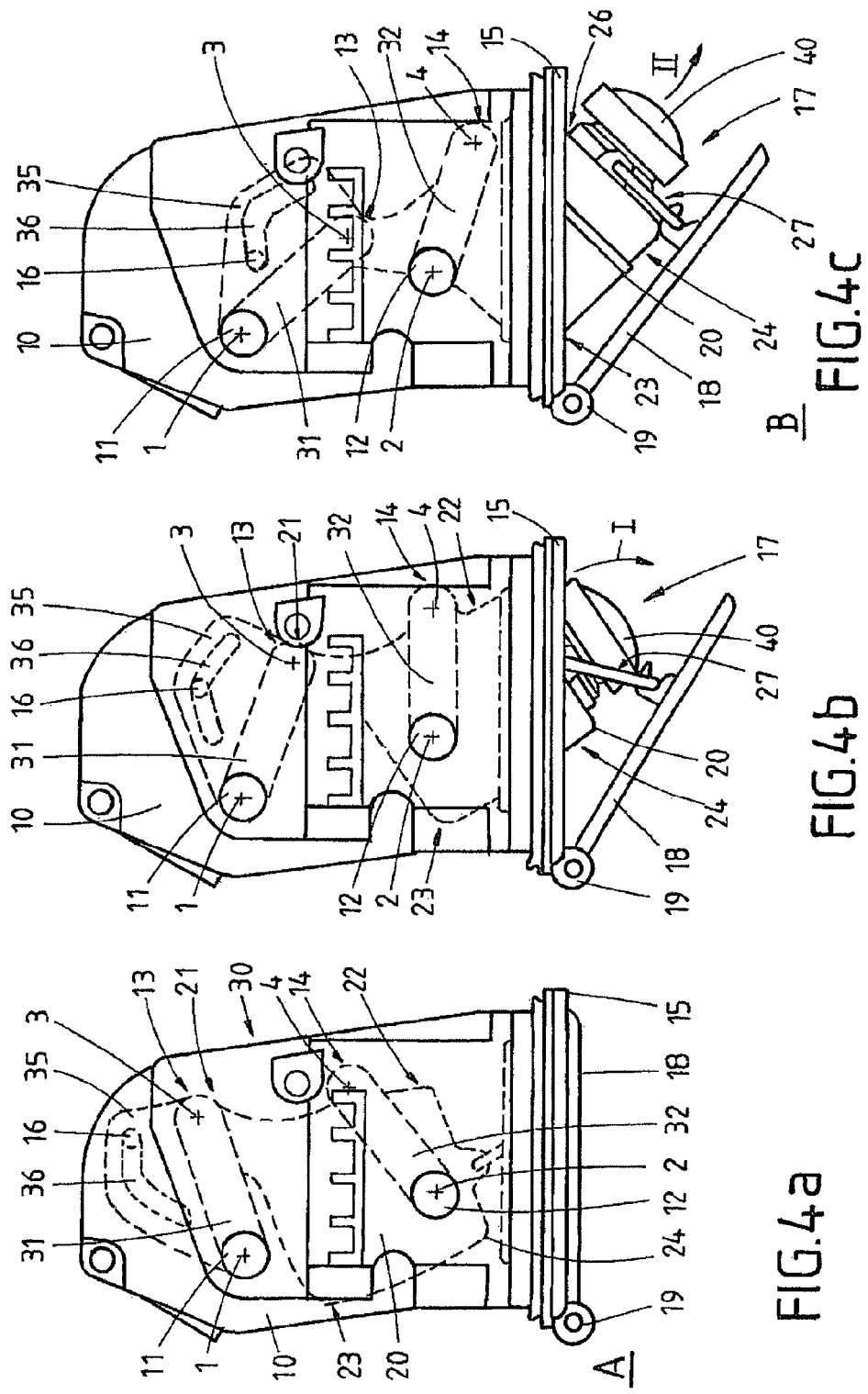

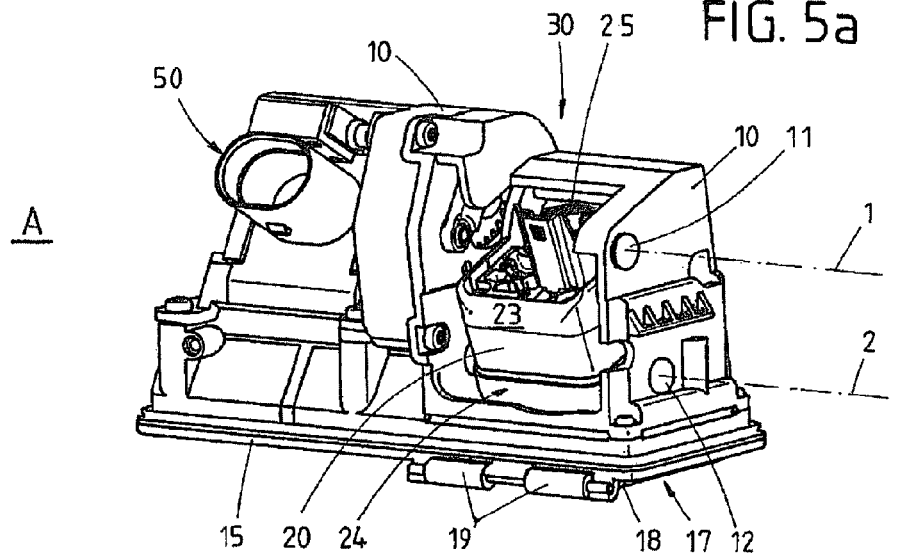
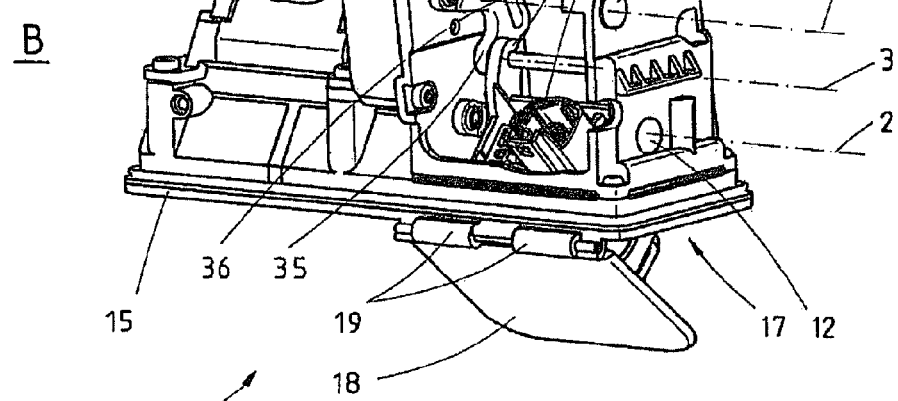

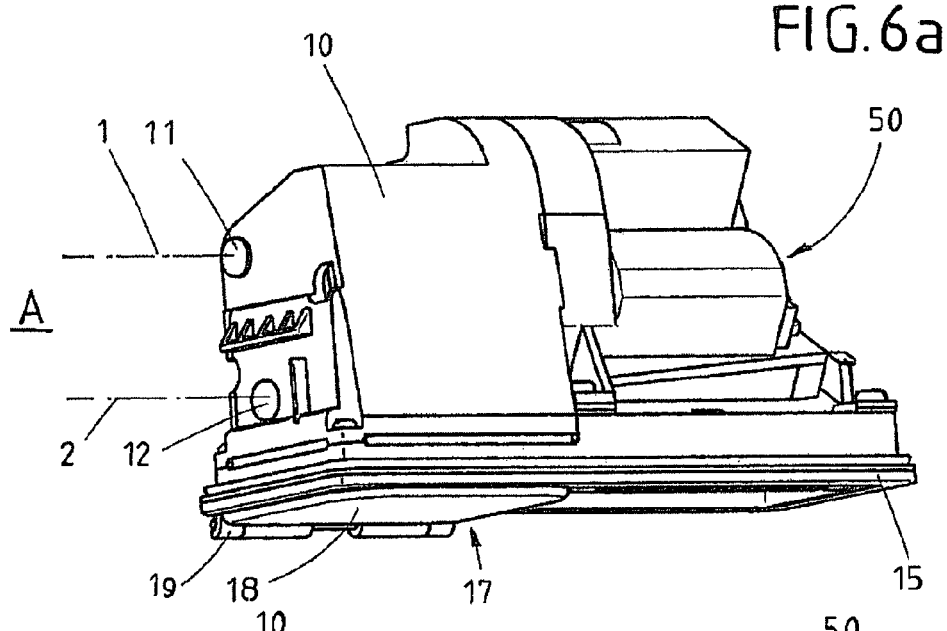
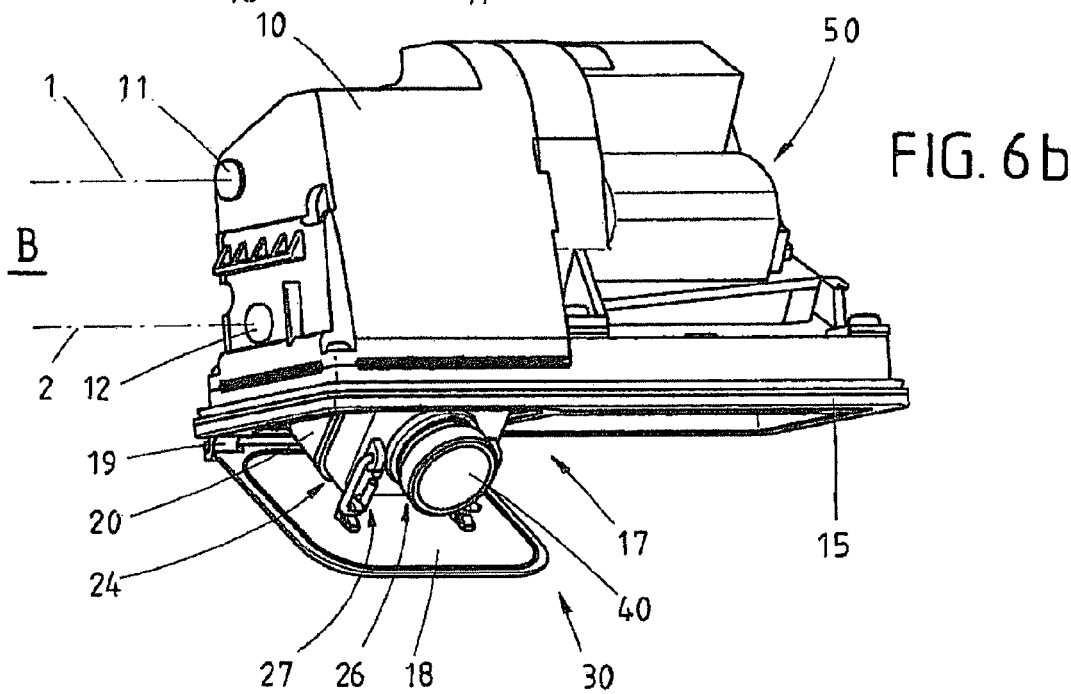

DEVICE FOR HOLDING A CAMERA HAVING FOUR JOINTS

RELATED APPLICATIONS

This application is a National Phase of PCT Patent Application No. PCT/EP2013/071085 having International filing date of Oct. 9, 2013, which claims the benefit of priority of German Patent Application No. 10 2012 109 611.2 filed on Oct. 10, 2012. The contents of the above applications are all incorporated by reference as if fully set forth herein in their entirety.

FIELD AND BACKGROUND OF THE INVENTION

The invention relates to a device for the acceptance of a camera which can particularly serve as a parking assistance of a vehicle. The device comprises a housing, in which the camera can be replaceably received and a gear which serves for moving the camera between a rest position and an operating position.

Devices with a camera which serve for the visual acquisition of the external area of a vehicle are already known from the state of the art. Such devices comprise a housing in which the camera is detachably received between a rest position and an operating position. For example, such cameras can be used in the area of the parking assistance of vehicles. If, for example, the reverse gear of the vehicle is used, the camera moves from the rest position into the operating position wherein the camera at least partially exceeds the housing. Thereby the area behind the vehicle is visually recorded by the camera and indicated on a display for the driver of the vehicle. If the reversing is ended and the driver of the vehicle removes the reverse gear the camera can move back from the operating position into the rest position.

In DE 10 2009 008 281 A1 a device for the acceptance of a camera is disclosed which is permanently installed in the present housing. Thereby, the disadvantage has occurred that the device can only accept a certain camera so that the maintenance and the exchange of the camera cannot be ensured. The device further provides a lid element for the protection of the camera in the rest position wherein the lid element is likewise permanently assembled at the housing. Herein, it is a disadvantage that during an accident, when the lid element is damaged, the device is at the same time irreparably damaged. Further, a gear is intended which comprises an adjuster mechanism for the camera and another adjuster mechanism for the lid element. The first adjuster mechanism moves the camera between a rest position and an operating position and the second adjuster mechanism moves the lid element between a closing position and an opening position. This renders the device structurally complicated, the device requires too many complicated components and a great construction space whereby the production and mounting of the device is complex and cost-intensive.

SUMMARY OF THE INVENTION

Therefore, the present invention has the object to provide a simple, cost-efficient and compact device for the acceptance of a camera which avoids the previously described disadvantages. Particularly, the device should be able to accept different cameras, enable an effective protection of the camera unit and comprise few component parts.

This object is solved by a device according to all features of the independent claim 1. Herewith, the invention intends that the device comprises a carriage which can exchangeably accept different cameras and that the carriage is moved by a gear which comprises a first swiveling element and a second swiveling element which are jointly connected to the carriage. The idea of the invention is that each swiveling element is rotatably mounted at the housing in a way that the carriage is rotatably mounted at each swiveling element in a way and that the carriage performs at least a first movement phase and second movement phase between a rest position and an operating position. The carriage is thereby guided by a two-phase movement that the space for the acceptance of the carriage is reduced and the device thus requires a simple construction with little construction space.

Advantageously, the carriage can comprise a housing-side mounting opening in order to exchangeably accept a camera. Through the mounting opening the camera can be inserted and removed in a simple manner. Further, the mounting opening can be configured for the acceptance of different camera models. The mounting opening can further be configured in a way that the camera is reliably kept in the carriage in an engaged state through a form and/or force fit. Further, the carriage can comprise latching and/or clamping elements in the mounting opening which can interact with complementary holding elements of the camera so that the camera is securely assembled within the carriage. Further the carriage can be configured with an acceptance opening indicating towards the outside through which the camera can be directed towards the outside. Through the opening an objective of the camera can visually recognize the outer area of a vehicle in the operating position of the carriage.

According to the invention the gear can comprise a first immobile or rigid axis at the housing about which the swiveling element can be moved and comprise a second immobile or rigid axis at the housing about which the second swiveling element can be moved. Constructionwise the first axis can proceed parallel to the second axis. This assembly of the first and the second axis enables that at least at the beginning of the first movement phase the swiveling elements which carry the carriage at two opposing lower sides are synchronously moved about a certain angle. Therewith, the posterior lower side of the carriage is moved about the first axis and the anterior lower side about the second axis.

According to the present invention the first swiveling element could be supported at the housing via a first joint and the second swiveling element could be supported at the housing via a second joint. Herein, the first axis can proceed through the first joint and the second axis through the second joint. The first and the second axis which can be rigidly assembled at the housing determine the rotation and/or swing axis of the swiveling elements and enable a secure and stabile guidance of the swiveling elements and therewith of the carriage for the camera. The movement of the swiveling elements and the carriage can thereby be limited left sided and right sided through the joints wherein the swinging arms of the swiveling elements can be moved within the levels which proceed vertical to the first and to the second axis through the first and second joint. When the swiveling elements perform a stabile swinging movement also the carriage adapts a stabile swinging movement between the rest position and the operating position.

According to a particular advantage the gear can comprise a third moveable axis at the first swiveling element about which the carriage can be moved and a fourth moveable axis at the second swiveling element about which the carriage can be moved. According to the invention the gear can be assembled in a way that the third axis moves parallel to the fourth axis during the movement of the carriage. According to the invention the third and fourth axis can be each moved along about the first and about the second axis together with the respective swiveling elements. Thus, the carriage cannot only be moved with the posterior lower side about the first immobile axis and with the anterior lower side about the second immobile axis but also with the posterior upper side about the third moveable axis and with an anterior upper side about the fourth moveable axis. Thereby, that the third and fourth axes are moved by themselves, the carriage can perform a two-phase wave-like movement. Thus it can be achieved that the necessary construction space for the assembly and for the guidance of the carriage and therewith the camera can be ideally reduced. Thereby, it is a particular advantage that the device for the acceptance of the camera can comprise in length and also in the width small construction dimensions.

According to the invention the first swiveling element can comprise a first connection element at which the carriage can be moveably mounted via a third joint and that the second swiveling element comprises a second connecting element at which the carriage is moveably mounted via a fourth joint. Herewith, the third axis can proceed through the third joint and the fourth axis through the fourth joint. Thereby, the advantage is achieved that the carriage is stably moved at four sides about four different parallel axes and at the same time can be conveyed forward in the operating position and back in the resting position.

According to the invention the gear can comprise four joints in order to guide the carriage between the rest position and the operation position. Four joints each can be assembled accordingly between the housing and a first side of the carriage and between the housing and a second side of the carriage. From four joints at each side of the carriage two joints can connect the housing and the swiveling elements and two further joints can connect the swiveling elements each with a posterior and an anterior upper side of the carriage. The carriage can therewith be moved about the first and the second axis via the first and second joint in a way and tilted about the moveable third axis and about the moveable fourth axis via the third and fourth joint in a way that the carriage passes through a wave-like or sinus-like movement between the rest position and the operating position. The four joints each at a side of the carriage limit the lateral mobility of the carriage and securely and stably guide the carriage to the front outside the housing in the operating position and backwards into the housing in the rest position.

According to the invention a posterior lower side of the carriage can be moved about the first axis in a first movement phase and an anterior lower side of the carriage about the second axis. Further, it can be intended according to the invention that during the second movement phase the posterior upper side of the carriage performs a tilting movement about the third axis and an anterior upper side of the carriage a tilting movement about the fourth axis.

It can be intended that the gear is constructed in a way that during the second movement phase a movement of the carriage about the second axis is blocked. Thereby, the carriage can at least partially be moved along in the direction of the operating position in a first movement phase via the synchronically swinging swiveling element. Subsequently, in the second movement phase the second swiveling element can stop at the anterior part of the housing for example at a stop wherein the first swiveling element further performs a swinging movement and a greater arch and wherein the posterior upper side of the carriage is moved upwards and at the same time tilted forward while the anterior upper side of the carriage is only tilted forward.

Alternatively, it can be intended that the gear can be composed in a way that the first movement phase and the second movement phase at least partially occur at the same time. Thereby, the posterior and anterior lower side of the carriage can be moved about the first and about the second axis wherein while the carriage moves upwards in a swinging movement the upper side of the carriage begins tilting forwards. The posterior upper and lower side of the carriage thereby pass through a greater arch and the anterior upper and lower side of the carriage a smaller arch. In summary it is ensured that the carriage runs through a wave-like or a sinus-like movement.

According to the invention the first swiveling element can comprise a guidance arm which can be configured with a guidance. Thereby, the guidance can interact with a sliding element of a drive in order to move the first swiveling element. Advantageously, only one drive is necessary in order to move the gear. Herefore, a cogwheel can be intended according to the invention. The drive can through the sliding element influence only one arm of one of both swiveling elements in order to move both swiveling elements and therewith the carriage. The guidance can be configured as an opening in the housing wall and/or as a slotted guidance and/or as a trace at the inner side of the housing wall. The guidance can be performed arch-like according to the invention in order to ensure that the first swiveling element can proceed a greater arch as the second swiveling element and that the carriage can comprise a sinus-like movement wherein a compact general arrangement is accomplished.

Advantageously, the housing can comprise an opening through which the carriage can extend in the operating position. Further, a lid element can be intended that can close the opening in the rest position of the carriage. This lid element can be assembled underneath a manufacturer sign at the rear end of the vehicle or can be the manufacturer sign itself. The lid element can thereby cover and protect the camera in the rest position. Further, the lid element can achieve a sealing function.

According to the invention a protection membrane can be intended which can sealingly close the free space between the opening in the housing and the carriage in order to avoid the penetration of dirt particles and moisture into the housing and protect the camera from weather influences. The protection membrane can be configured in form of a bellow membrane particularly tube-like. Thereby, one edge of the bellow-like protection membrane can be assembled at one edge of the opening outside at the housing. This edge of the protection membrane can thereby be assembled or clamped between the edge of the opening and the housing lid and/or glued on the edge of the opening by a form and/or force fit. The second edge of the bellow-like protection membrane can be assembled at an opening, particularly the acceptance opening, outside at the carriage. This edge of the protection membrane can be kept at the edge of the opening by a clamping ring and/or glued on the edge of the opening. The protection membrane can thereby be configured from an elastic material. During the movement of the carriage the protection membrane can be deformed. Advantageously, the membrane sealingly closes the opening in the housing so that neither dirt nor moisture can penetrate into the housing and damage the camera.

Thus it can be intended that the opening is configured with a collar element at which the lid element can noiseless abut and if necessary absorb when the carriage is in the rest position wherein particularly the collar element can be configured from an elastic material.

The housing of the device and/or the gear and/or the carriage and/or the swiveling elements can be configured from any plastic, metal or the like which particularly comprises a higher hardness than the material of the protection membrane and/or the collar element.

Advantageously, it can be intended that the lid element does not need a particular drive. According to the invention the lid element can be pushed open through the camera during the movement from the rest position into the movement position in an opening position according to the camera. Back in the closing position the lid can fall down under the effect of its own gravity and/or can be pulled tight through a connection element at the carriage. The carriage can thereby be in a mechanic operational connection with the lid element in a way that during the movement between the rest position and the operating position the carriage moves the lid element along between the open position and the closing position. Herewith it can be intended that the carriage comprises at least one pestle and/or the carriage can be connected with the lid element in a form and/or force fitting manner.

Advantageously, the lid element can be assembled pivotably and/or detachably at the housing via a swinging joint and/or in a form fitting and/or force fitting manner. Herewith it is ensured that the lid element can be pushed open and/or retracted without being driven by the camera or the carriage. Only a pivotable connection of the lid element with the housing is necessary. Further the lid can be configured detachable or removable. Therewith, a particular advantage is achieved that in case of a collision with another vehicle or object the lid element can even be damaged or can fall off, however the camera is not damaged by the effect onto the lid element. If the lid element stays in an open position no danger for the interior of the device occurs and it only falls off during a mechanical impact on the lid element.

BRIEF DESCRIPTION OF THE SEVERAL VIEWS OF THE DRAWINGS

According to the invention the features of the description of the device according to the invention can be essential for the invention single by themselves or in any combination. Further features improving the invention are subsequently described in detail together with the description of the preferred embodiments of the invention by means of the figures. It is shown:

FIG. 4a a lateral view of the device according to the invention in a rest position of the carriage, FIG. 4b a lateral view of the device according to the invention in a position between the rest position and the operating position of the carriage, FIG. 4c a lateral view of the device according to the invention in an operating position of the carriage, FIG. 5a a perspective view of the device according to the invention in a rest position of the carriage, FIG. 5b a perspective view of the device according to the invention in an operating position of the carriage, FIG. 6a a perspective view of the device according to the invention in a rest position of the carriage from another point of view as in FIGS. 5a and 5b, and FIG. 6b a perspective view of the device according to the invention in an operating position of the carriage from the point of view of FIG. 6a.

DESCRIPTION OF SPECIFIC EMBODIMENTS OF THE INVENTION

Figure 1:
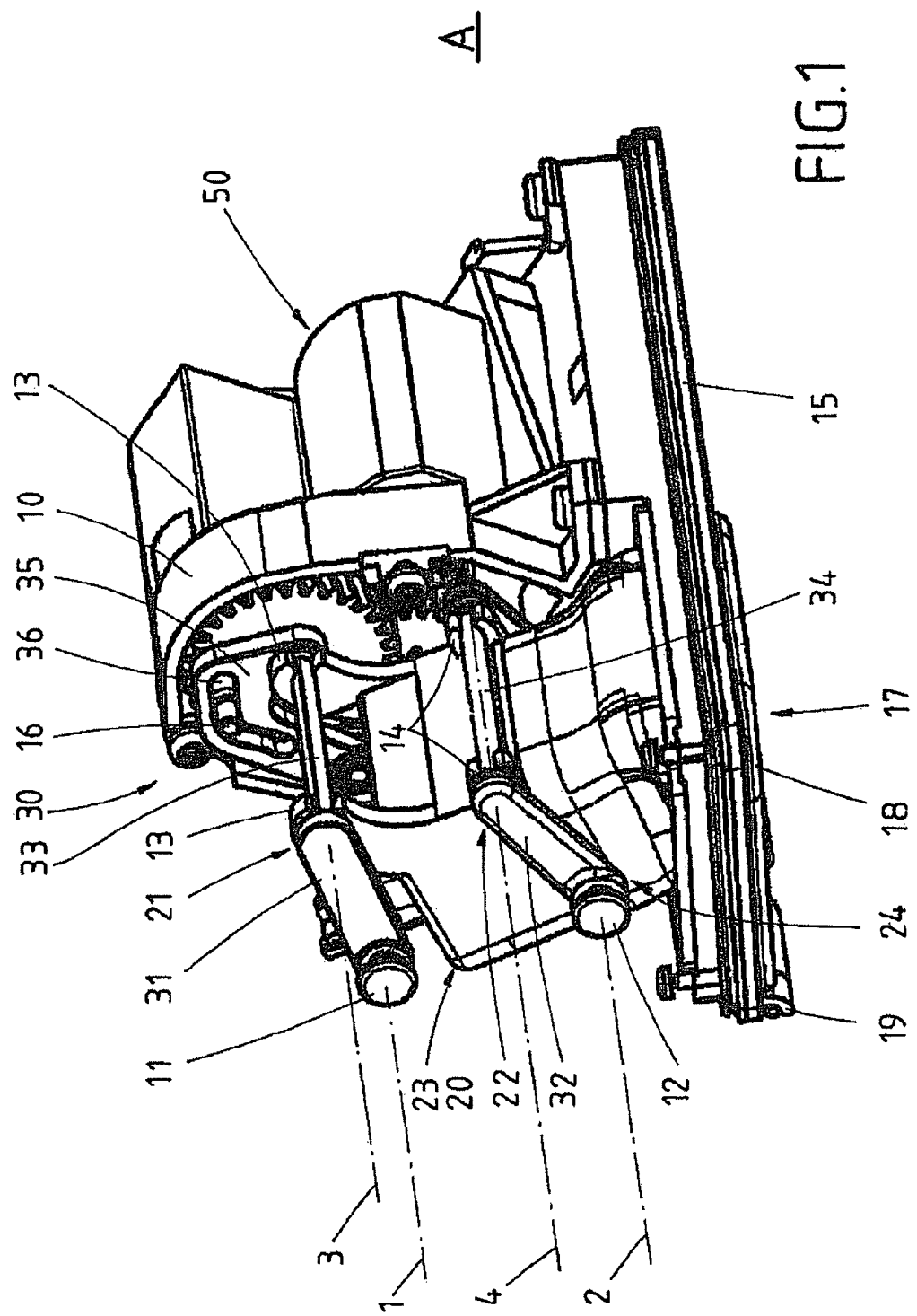
FIG. 1 a device according to the invention in a perspective view.

FIG. 1 shows a device according to the invention comprising a carriage 20 which can exchangeably accept a camera 40 and a gear 30 which can move the carriage 20 between a rest position A and an operation position B. The gear 30 comprises a first swiveling element 31 and a second swiveling element 32 which are jointly connected with the carriage 20. The swiveling elements 31, 32 are pivotably mounted at a housing 10 via a first 11 and second joint 12. The joints 11, 12 are thereby configured in form of pens or screws which can be guided through holes in the arms of the swiveling elements 31, 32 and can be limited at the edges via a screw head or a screw-nut. The swiveling elements 31, 32 comprise each a connecting element 33, 34 which is configured in form of a rod and each connects two arms of the swiveling elements 31, 32. At the connecting elements 33, 34 the carriage 20 is pivotably mounted via a third 13 and fourth joint 14. By the four joints 11, 12, 13, 14 the carriage 20 can perform a two-phase movement between the rest position A and the operating position B. The FIG. 1 shows a carriage 20 in a retracted rest position A, in which the camera 40 is assembled within the housing 10 protected by a lid element 18 which closes an opening 17 in a housing lid 15. The lid element 18 is detachably mounted at the housing lid 15 via a swivel joint 19 and can be moved along with the carriage 20 between an opening position and a closing position when the carriage 20 is moved between a rest position A and an operating Position B not shown in FIG. 1.

The gear 30 comprises a first axis 1 immobile assembled at the housing 10 about which the first swiveling element 31 can be moved and a second axis 2 immobile assembled at the housing 10 about which the second swiveling element 32 can be moved. The first axis 1 thereby proceeds parallel to the second axis 2 wherein a posterior lower side 21 of the carriage 20 can be moved about first axis 1 and the anterior lower side 22 of the carriage 20 can be moved about the second axis 2. The first axis 1 proceeds according to the invention through the first joint 11 and the second axis 2 through the second joint 12. The extending direction of the connecting elements 33, 34 each determines a third moveable axis 3 at the first swiveling element 31 and the forth moveable axis 4 at the second swiveling element 32 about which the carriage 20 can be moved likewise. During the movement of the carriage 20 the third axis 3 is moved parallel to the fourth axis 4 wherein the third 3 and the fourth axis 4 can be moved with the respective swiveling elements 31, 32 along about the first 1 and about the second axis 2. Thereby, the carriage 20 moves with the posterior lower side 21 about the first immobile axis 1 and with the anterior lower side 22 about the second immobile axis 2. At the same time the carriage moves also with the posterior upper side 23 about the third mobile axis 3 and with the anterior upper side 24 about the fourth mobile axis 4 in an opposing swinging direction.

The first swiveling element 31 comprises a guidance arm 35 which is configured with a guide 36. Thereby, the guide 36 interacts with a sliding element 16 of a drive 50 in order to move the first swiveling element 31. The drive 50 therewith moves the gear 30 wherein the effect on the first swiveling element 31 is transferred also to the second swiveling element 32 via the carriage 20. The drive 50 is for example shown as a cogwheel drive. The guidance 36 is according to the shown embodiment configured as a notch in the guidance arm 35 of the first swiveling element 31. Alternatively, it is possible that the guidance 36 can be configured as a spotted guidance and/or as a trace inside at the housing wall. The guidance 36 is according to the invention configured arch-like with a peak point and two stop points. In the rest position A of the carriage 20 the sliding element 16 driven by the drive 50 can be moved until a stop point which is further away from the axis than the other stop point. While the drive 50 further drives the sliding element 16 in a clockwise direction in FIG. 1 in the direction to the housing lid 15, the sliding element 16 effects that the guidance arm 35 of the first swiveling element 31 is likewise moved about the first axis 1 in the direction of the housing lid 15.

In the beginning of the first movement phase I which is described in detail in FIGS. 4a, 4b the first swiveling element 31 moves initially synchronously with the second swiveling element 32 on which the effect of the swiveling element 16 is transferred via the carriage 20. Therewith that the carriage 20 is jointly assembled at the swiveling elements 31, 32 and by the impact loss at the joints 13, 14 the second swiveling element 32 is slightly retarding while the first swiveling element 31 proceeds a greater arch than the second swiveling element 32.

As a result the sliding element 16 slides during the swinging movement of the first swiveling element 31 in the guidance 36 in the direction to the peak point. This enables a swinging movement of the first swiveling element 31 about a greater angle than the swinging movement of the second swiveling element 32 since the effective swinging radius of the guidance arms 35 in the direction of the peak point of the guidance 36 is getting smaller than in the stop point which is further away from the first axis 1. In the first movement phase I the carriage 20 moves initially with a posterior lower side 21 about the first axis 1 and with the anterior lower side 22 about the second axis 2. Due to the impact loss at the joints 13, 14 this swinging movement is retarded until the first swiveling element 31 drives an even greater arch and starting from a certain point to the posterior lower side 21 of the carriage 20 pushes in an opposing direction as the second swiveling element 32 to the anterior lower side 22. This effects that the carriage 20 starts tilting about the moveable axes 3, 4. Thus, the carriage 20 experiences a sinus-like movement between the rest position A like shown in FIG. 1 and the operating position B which is described in detail in the subsequent description of FIGS. 4c, 5a and 5b.

Figure 2:
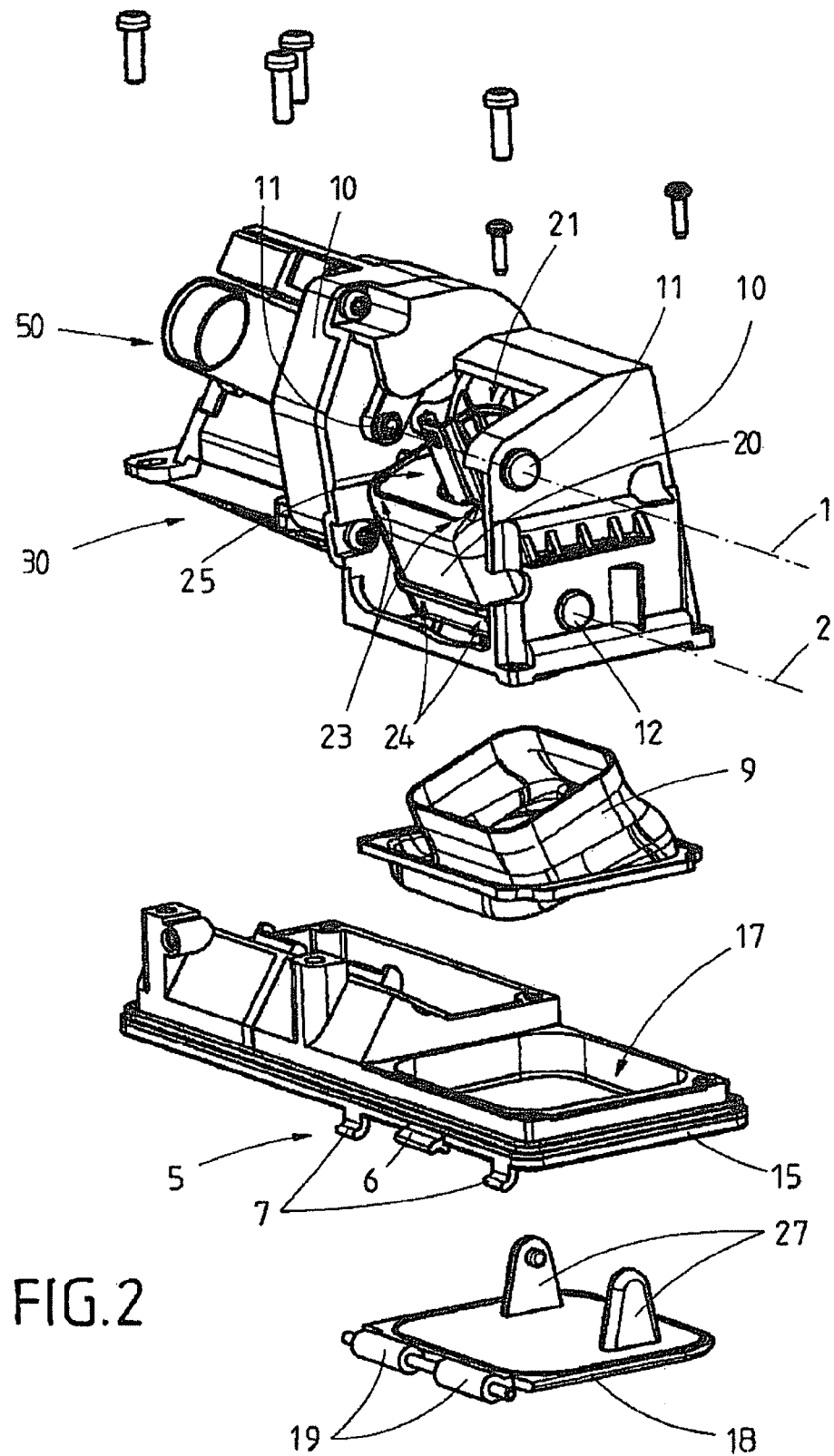
FIG. 2 a device according to the invention in an exploded view.

The FIG. 2 shows a device according to the invention in an exploded view with the carriage 20 for a camera 40 and a gear 30 for moving the carriage 20 between the rest position A and an operating position B. The gear 30 comprises a first swiveling element 31 and a second element swiveling element 32 for the carriage 20 which are assembled at a housing 10 by a first 11 and a second joint 12 and are shown in detail in FIG. 1 and in the FIGS. 4a, 4b and 4c. The swiveling elements 31, 32 can be moved about a first 1 and a second axis 2 by a drive 50 wherein the first axis 1 proceeds through the first joint 11 and about the second axis 2 through the second joint 12. The posterior lower side 21 of the carriage 20 can thereby be moved about the first axis 1 and the not shown anterior lower side 22 of the carriage 20 about the second axis 2. Further, the carriage 20 can be moved with the posterior upper side 23 about the third moveable axis 3 together with the first swiveling element 31 and with the anterior upper side 24 about the fourth moveable axis 4 together with a second swiveling element 32 wherein the third 3 and the fourth axis 4 can be recognized even better in FIG. 1 and in the FIGS. 4a to 4c.

The carriage 20 further comprises a mounting opening 25 through which the camera 40 can be exchangeably accepted within the device. The housing 10 of the device accepts the swiveling elements 31, 32 and the carriage 20 with the camera 40. The housing 10 is screwed with the housing lid 15. Within the housing lid 15 an opening 17 is intended through which the camera 40 can extend in an extended state. Between the housing lid 15 and the carriage 20 a protection membrane 9 is assembled which is configured as a bellow membrane. Thereby, one edge of the protecting membrane 9 is clamped and/or screwed and/or glued between the housing lid 15 and the edge of the housing 10 which edge defines the opening 17. The other edge of the protection membrane 9 is wrapped about the carriage 20 at the edge of a not shown acceptance opening 26 for the camera 40.

Further, a lid element 18 is intended at the outside which is jointly and detachably assembled at the housing lid 15 via a swivel joint 19. The housing lid 15 therefore comprises a storage 5 which comprises an inner storage element 6 and two outer storage elements 7 in order to pivotably store the swivel joint 19. The interior storage element 6 is thereby half opened towards one side and the outer storage elements 7 are half opened to another side in order to detachably accept the swivel joint 19. The lid element 18 can be moved along with the carriage 20 between an open position and a closing position when the carriage 20 moves between a rest position A in FIG. 4a and an operating position B in FIG. 4c. The lid element 18 thereby comprises a detachable connection element 27 through which it can be detachably connected with the carriage 20. The lid element 18 can according to the invention be moved drive-free between an open position and a closing position. When the carriage 20 is moved in the operating position B the carriage 20 or the camera 40 pushes the lid element 18 in the open position. When the carriage 20 moves back in the rest position A the lid element 18 is moved along through the detachable connecting element 27 in the closing position.

Figure 3:
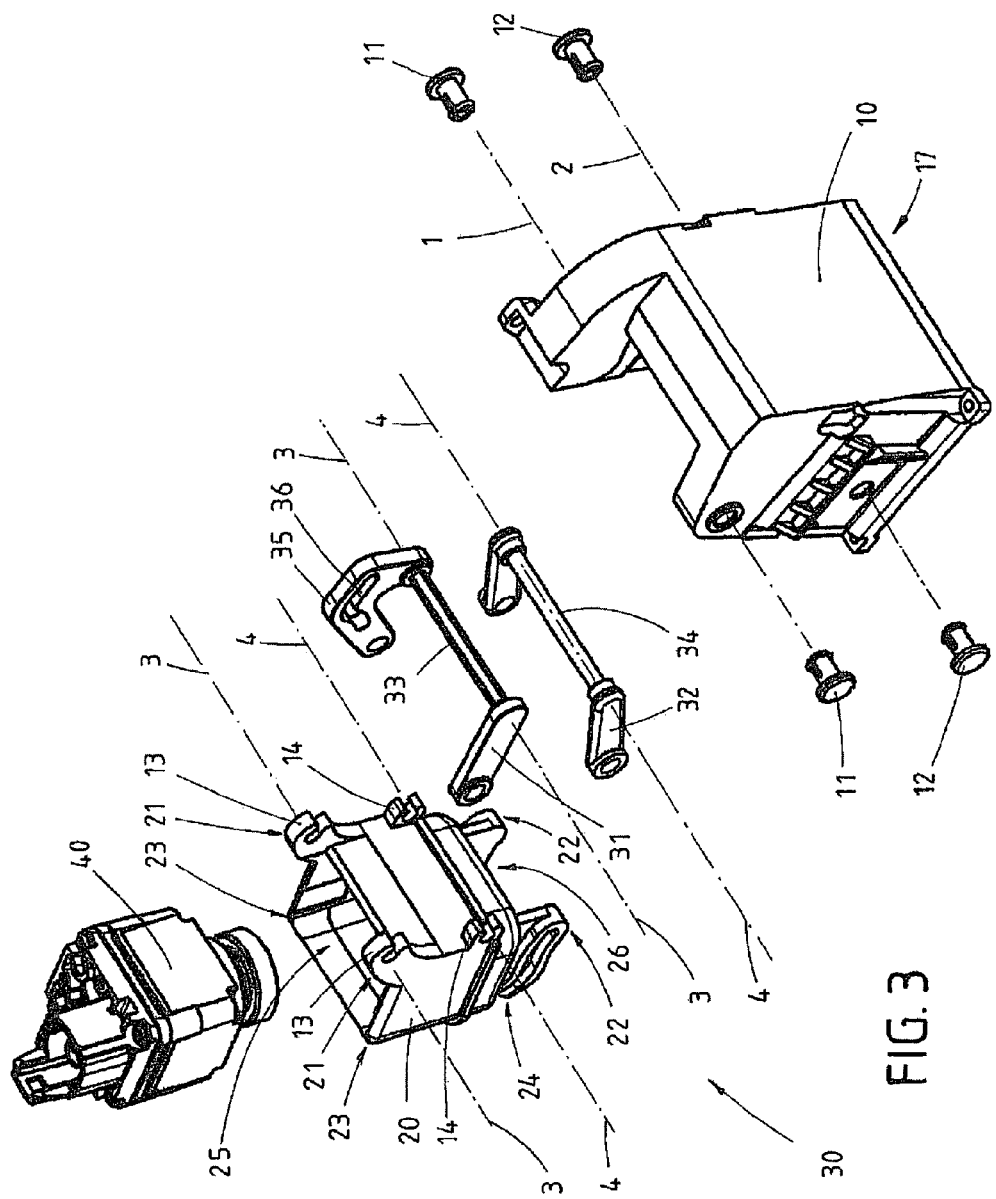
FIG. 3 a gear according to the invention in an exploded view.

FIG. 3 shows a gear 30 according to the invention in an exploding view which comprises a first swiveling element 31 and a second swiveling element 32. The swiveling elements 31, 32 are jointly connected with the carriage 20. The swiveling elements 31, 32 are swingably mounted at a housing 10 via a first 11 and a second joint 12. The joints 11, 12 are thereby configured in form of screws which extend through holes in the arms of the swiveling elements 31, 32 and are secured with a screw nut inside at the swiveling element 31, 32. Each swiveling element 31, 32 comprises a connecting element 33, 34 which acts as a swinging seat for the carriage 20 by connecting each to arms of the respective swiveling element 33, 34. The carriage 20 is pivotably mounted at the connecting elements 33, 34 via a third 13 and a fourth joint 14. The third 13 and the fourth joint 14 are each configured in form of two angled solid spanner jaws at the sides of the connecting elements 33, 34 which enable a pivotable movement of the carriage 20 about the connecting elements 33, 34. The four joints 11, 12, 13, 14 further enable that the carriage 20 can perform a two-phase wave-like or sinus-like movement between a rest position A and an operating position B.

The carriage 20 is accepted in a housing 10 which comprises an opening 17 through which the carriage 20 and the camera 40 can extend towards the outside. The gear 30 comprises according to the invention a first immobile axis 1 assembled at the housing 10 which proceeds through the first joint 11 and the second axis 2 immobile assembled at the housing 10 which proceeds through the second joint 12. The first axis 1 is thereby aligned parallel towards the second axis 2 wherein the posterior lower side 21 of the carriage 20 can be moved about the first axis 1 and the anterior lower side 22 of the carriage 20 about the second axis 2. The extending direction of the connecting elements 33, 34 determines a third moveable axis 3 at the first swiveling element 31 and a fourth moveable axis 4 at the second swiveling element 32 which corresponds to the extension direction along the two joints 13 and along the two joints 14 in the assembled state. The gear 30 is configured in a way that the third axis 3 always extends parallel to the fourth axis 4 and to the first axis 1 and to the second axis 2 wherein the third axis 3 and the fourth axis 4 are each moved along about the first axis 1 and about the second axis 2 together with the respective swiveling element 31, 32. Therewith the carriage 20 moves further with the posterior upper side 23 about the third moveable axis 3 and with the anterior upper side 24 about the fourth moveable axis 4. The first swiveling element 31 is configured with a guidance arm 35 which comprises a guidance 36. The guidance 36 interacts according to the invention with a sliding element 16 of a not shown drive 50 in order to move the first swiveling element 31. The guidance 36 is thereby configured as a notch in the guidance arm 35 of the first swiveling element 31. The guidance 36 comprises an arch-like form which comprises a peak point and two stop points in order to realize a two-phase movement of the carriage 20.

The carriage 20 is configured with a housing side mounting opening 25 in order to accept a camera 40. Through the mounting opening 25 the camera 40 can be easily inserted and exchanged. Advantageously, the mounting opening 25 can be assembled for the acceptance of different camera models. The camera 40 can be reliably kept in the carriage 20 via a form and/or force fit and/or can be secured with additional rest and/or clamping elements in the carriage 20. Further, the carriage 20 comprises an acceptance opening 26 directed towards the outside through which the camera 40 can record the outer area in an extended state. The camera 40 can thereby be moved between a retarded position and an extending position when the carriage 20 is moved between the rest position A and the operating position B.

FIGS. 4a, 4b and 4c show in a lateral view how the gear 30 according to the invention drives the carriage 20 between a rest position A of FIG. 4a and an operating position B of FIG. 4c. In the first movement phase I between the position in FIG. 4a and in FIG. 4b a posterior lower side 21 of the carriage 20 moves about the first axis 1 and an anterior lower side 22 of the carriage 20 about the second axis 2. In the second movement phase II between the position in FIG. 4b and in FIG. 4c the posterior upper side 23 of the carriage 20 moves in an opposing direction along an arch-like curve about the third axis 3 and an anterior upper side 24 of the carriage 20 experiences a tilting movement about a fourth axis 4. The carriage 20 therewith performs a first arch along the arrow I in FIG. 4b and a second arch along the arrow II in FIG. 4c which together result in a sinus-like movement curve of the carriage 20. It can thereby be intended that in the second movement phase II a movement of the carriage 20 about the second axis 2 is blocked. Thereby, the carriage 20 is moved along in the first movement phase I between the position in FIG. 4a and in FIG. 4b almost synchronously together with the swiveling elements 31, 32 about the axes 1, 2 in the direction of the operating position B in FIG. 4c. In the second movement phase II the second swiveling element 32 can be stopped wherein the first swiveling element 31 can further perform a swinging movement and wherein the posterior upper side 23 of the carriage 20 is moved further downwards in the direction of the operation position B in view of FIGS. 4a to 4c and at the same time is tilted to the right about third axis 3 while the anterior upper side 24 of the carriage 20 is only tilted towards the right about the fourth axis 4.

Likewise it can be intended that the first movement phase I and the second movement phase II at least partially overlap. Thereby, the posterior 21 and the anterior lower side 22 of the carriage 20 can be moved about the first axis 1 and about the second axis 2 wherein the carriage 20 performs a swinging movement along the arrow I in FIG. 4b and at the same time the upper sides 23, 24 of the carriage 20 can be tilted towards the left along the arrow II in FIG. 4c. The carriage 20 thereby proceeds a wave-like movement initially along the arrow I in FIG. 4b and subsequently along the arrow II in FIG. 4c.

The first swiveling element 31 comprises a guidance arm 35 according to FIGS. 4a to 4c which is configured with the guidance 36 in which in a sliding element 16 of a not shown drive 50 engages in order to move the first swiveling element 31 and therewith likewise move the second swiveling element 32 about the carriage 20. The device according to the invention thereby comprises a housing 10 which accepts the gear 30 and comprises an opening 17 through which the carriage 20 can extend in the operating position B of FIG. 4c. The opening 17 in the housing 10 is closed with the lid element 18 in the rest position A of FIG. 4a. The lid element 18 can thereby close and protect the camera 40 in the rest position A. The lid element 18 is thereby pivotably and detachably assembled at the housing 10 via a swivel joint 19 wherein the lid element 18 can be pushed open and/or can be retarded through the carriage 20 without a drive. The lid element 18 is thereby in an operating connection with the carriage 20 via a detachable connecting element 27.

The FIGS. 5a, 5b and 6a, 6b show a device according to the invention in a perspective view from top and from the bottom, wherein the FIGS. 5a and 6a show the device in a rest position A of the carriage 20 and the FIGS. 5b and 6b show the device in an operation position B. The device comprises a housing 10 which comprises a housing lid 15 which extends towards the outside out of the vehicle. In the housing lid 15 an opening 17 is intended through which a moveable carriage 20 can proceed from the rest position A in the operating position B wherein in the operating position B a camera 40 which is detachably assembled in the carriage 20 extends through the opening 17 and can record the outer area of the vehicle. The carriage 20 comprises at this side an acceptance opening 26 through which the objective of the camera 40 can reach. At the housing lid 15 a lid element 18 is assembled which covers the opening 17 in the rest position A of the carriage 20. Herein, the lid element 18 is detachably assembled at the housing 10 via a swivel joint 19. At the inner side of the housing 10 like shown in FIGS. 5a and 5b the housing 10 is configured with another opening through which the camera 40 can be inserted during the mounting in a mounting opening 24 of the carriage 20. Thereby the camera 40 can be kept non-slippably in the carriage 20 via a form and/or force fit or via latching elements. The housing 10 can cover a gear 30 and a drive 50 wherein the gear 30 serves for driving the carriage 20. The drive 50 is configured as a cogwheel drive with a sliding element 16 which engages in a guidance 36 at a guidance arm 35 of a first swiveling element 31 of the gear 30 and moves the first swiveling element 31. Thereby, the first swiveling element 31 transfers the movement to the carriage 20 and further to the second swiveling element 32. The swiveling elements 31, 32 are pivotably mounted at the housing 10 via two joints 11, 12 correspondingly about the first axis 1 and the second axis 2. The gear 30 is according to the invention configured in a way that the carriage 20 performs a two-phase wavelike movement between the rest position A and the operating position B wherein in the second movement phase II a posterior upper side 23 and an anterior upper side 24 is moved about the third axis and the not shown fourth axis 4.

Advantageously, the lid element 18 can easily fall off during an accident or a collision with another vehicle or another object or a user from the swivel joint 19 in order not to transfer the impact to the device and in order not to damage the other vehicle or the other object or not to injure the user. According to the invention the lid element 18 does not require a particular drive. The lid element 18 can be brought between an open position and a closing position according to the opening 17 through the carriage 20 wherein the carriage 20 comprises a detachable connecting element 27 to the lid element 18.

According to the invention further a protecting membrane 9 not shown in FIGS. 5a to 6b can be intended in order to seal the free space between the opening 17 in the housing 10 and the carriage 20. The protecting membrane 9 can advantageously avoid the penetration of dirt particles and moisture into the housing 10 and protect the camera 40 from weather influences. The protecting membrane 9 can like previously shown in FIG. 2 be configured as a bellow membrane. The protecting membrane 9 can be configured from elastic material wherein during the movement of the carriage the protecting membrane 9 can be deformed.

Further it can be intended that the opening 17 is configured with a collar element from elastic material at which the lid element 18 can absorb in order to avoid closing noises when the carriage 20 retracts in the rest position A.

The housing 10 of the device and/or the gear 30 and/or the carriage 20 and/or the swiveling elements 31, 32 can for example be configured from plastic and be processed by a forming process like casting or injection moulding. The housing 10 and the gear 30 including the swiveling elements 31, 32 can be processed from a first material and the protecting membrane 9 and the collar element from a second material wherein the first material comprises a higher hardness than the second material.

All features and/or advantages from the claims, the description or the drawings including constructive details and spatial assemblies can be essential for the invention, for themselves or in different combinations particularly based on FIGS. 1 to 6b.

REFERENCE LIST 1 first axis
2 second axis
3 third axis
4 fourth axis
5 support
6 internal support element
7 external support element
9 protecting membrane
10 housing
11 first joint
12 second joint
13 third joint
14 fourth joint
15 housing lid
16 slide element
17 opening in housing
18 lid element
19 swivel joint of the lid element
20 carriage
21 posterior lower side of the carriage
22 anterior lower side of the carriage
23 posterior upper side of the carriage
24 anterior upper side of the carriage
25 mounting opening
26 acceptance opening
27 detachable connecting element of the lid element 18
30 gear
31 first swiveling element
32 second swiveling element
33 first connecting element of the first swiveling element
34 second connecting element of the second swiveling element
35 guidance arm of the first swiveling element
36 guidance within the guidance arm
40 camera
50 drive
A rest position
B operating position
I first movement phase
II second movement phase

The invention claimed is:

1. Device for the acceptance of a camera with
   a housing in which a carriage is pivotably accepted at which a camera can be assembled, wherein the carriage can be driven by a gear which the gear comprises a first swiveling element and a second swiveling element which are jointly connected with the carriage wherein each swiveling element is pivotably assembled within the housing in a way and the carriage is pivotably mounted at each swiveling element in a way that the carriage performs at least a first movement phase and a second movement phase between a rest position and an operating position,
   wherein each of the first movement phase and the second movement phase is movement in a different axis,
   wherein during the first movement phase a posterior lower side of the carriage is moved about a first axis and an anterior lower side of the carriage about a second axis,
   and wherein during the second movement phase a posterior upper side of the carriage performs a tilting movement about a third axis and an anterior upper side of the carriage performs a tilting movement about a fourth axis.

2. Device according to claim 1,
   wherein the carriage comprises a housing-side mounting opening in order to detachably receive the camera or an acceptance opening facing towards the outside through which the camera is directed towards the outside.

3. Device according to claim 1,
   wherein
   the gear comprises the first axis at the housing about which the first swiveling element is moved and the second axis at the housing about which the second swiveling element is moved and that the first axis proceeds parallel to the second axis.

4. Device according to claim 3,
wherein
the gear is assembled in a way that during the second movement phase a movement of the carriage about the second axis is blocked and
that the gear is assembled in a way that the first movement phase and the second movement phase at least partially occur at the same time.

5. Device according to claim 1,
wherein the first swiveling element is mounted at the housing via a first joint and the second swiveling element is mounted at the housing via a second joint wherein the first axis proceeds through the first joint and the second axis through the second joint.

6. Device according to claim 5,
wherein
the gear comprises four joints in order to guide the carriage between the rest position and the operating position.

7. Device according to claim 1, wherein
the gear comprises the third axis at the first swiveling element about which the carriage is moved and the fourth axis at the second swiveling element about which the carriage is moved.

8. Device according to claim 7,
wherein
the gear is assembled in a way that the third axis moves parallel towards the fourth axis during the movement of the carriage.

9. Device according to claim 1,
wherein
the first swiveling element comprises a first connecting element at which the carriage is pivotably mounted via a third joint and that the second swiveling element comprises a second connecting element at which the carriage is pivotably mounted via a fourth joint wherein the third axis proceeds through the third joint at the fourth axis through the fourth joint.

10. Device according to claim 1,
wherein
the housing comprises an opening through which the carriage extends in the operating position and that a lid element is intended which closes the opening in the rest position of the carriage.

11. Device according to claim 10,
wherein a protecting membrane is intended which sealingly closes the free space between the opening in the housing and the carriage in order to avoid the penetration of dirt particles and moisture into the housing.

12. Device according to claim 10,
wherein
the opening comprises a collar element at which the lid element abuts when the carriage is in the rest position wherein the collar element is configured from an elastic material.

13. Device according to claim 10,
wherein
the carriage and the lid element are in a mechanical operational connection and that during the movement from the rest position into the operating position the carriage moves the lid element.

14. Device according to claim 13,
wherein
the carriage comprises at least one pestle or that the carriage is connected with the lid element in a form or force fitting manner.

15. Device according to claim 10,
wherein the lid element is pivotably or detachably assembled at the housing via a swivel joint or in a form fitting or force fitting manner.

16. Device according to claim 15,
wherein
the swivel joint is pivotably mounted at the support of a housing lid wherein the support comprises an inner support element and two outer support elements.

17. Device for the acceptance of a camera with
a housing in which a carriage is pivotably accepted at which a camera can be assembled, wherein the carriage can be driven by a gear which the gear comprises a first swiveling element and a second swiveling element which are jointly connected with the carriage wherein each swiveling element is pivotably assembled within the housing in a way and the carriage is pivotably mounted at each swiveling element in a way that the carriage performs at least a first movement phase and a second movement phase between a rest position and an operating position,
wherein each of the first movement phase and the second movement phase is movement in a different axis,
wherein during the first movement phase a posterior lower side of the carriage is moved about a first axis and an anterior lower side of the carriage about a second axis,
wherein during the second movement phase a posterior upper side of the carriage performs a tilting movement about a third axis and an anterior upper side of the carriage performs a tilting movement about a fourth axis, and
wherein the first swiveling element comprises a guidance arm which is configured with a guidance, wherein the guidance interacts with a slide element of a drive in order to move the first swiveling element.

* * * * *